(12) United States Patent
Cha et al.

(10) Patent No.: US 8,279,820 B2
(45) Date of Patent: Oct. 2, 2012

(54) APPARATUS AND METHOD FOR ALLOCATING ID CELL TO AVOID PREAMBLE PSEUDO NOISE CODE DUPLICATION IN BROADBAND WIRELESS COMMUNICATION SYSTEM

(75) Inventors: Jin-Kyung Cha, Seoul (KR); Gil-Ryun Nam, Suwon-si (KR); Jae-Ho Lee, Yongin-si (KR); Jae-Ho Jeong, Yongin-si (KR); Soo-Yeul Oh, Seoul (KR); Pyeong-Hwan Wee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 12/590,487

(22) Filed: Nov. 9, 2009

(65) Prior Publication Data

US 2010/0118809 A1    May 13, 2010

(30) Foreign Application Priority Data

Nov. 10, 2008    (KR) .................. 10-2008-0110984

(51) Int. Cl.
*H04W 4/00* (2009.01)
*H04W 40/00* (2009.01)

(52) U.S. Cl. .................. 370/329; 455/446

(58) Field of Classification Search .................. 370/329; 455/446
See application file for complete search history.

(56) References Cited

U.S. PATENT DOCUMENTS

| | | | | |
|---|---|---|---|---|
| 7,782,816 | B2* | 8/2010 | Cho et al. | 370/329 |
| 2005/0111522 | A1* | 5/2005 | Sung et al. | 375/145 |
| 2007/0041348 | A1* | 2/2007 | Kwun et al. | 370/335 |
| 2008/0090576 | A1* | 4/2008 | Sung et al. | 455/446 |
| 2008/0090577 | A1* | 4/2008 | Sung et al. | 455/449 |
| 2011/0222504 | A1* | 9/2011 | Ma et al. | 370/330 |

* cited by examiner

*Primary Examiner* — Kenny Lin (57) ABSTRACT

An apparatus is configured to allocate an IDentification (ID) cell to avoid duplication of a preamble Pseudo Noise (PN) code in a broadband wireless communication system. The apparatus selects one sector inside the system. A temporary ID cell for the selected sector is selected. Whether an ID cell of a sector to which an ID cell has been already allocated inside a minimum unit group for ID cell allocation is the same as the temporary ID cell is determined. Whether PN codes of sectors inside a neighbor list of the selected sector are the same as temporary PN codes determined using the temporary ID cell are determined. When the temporary ID cell is not duplicated and the temporary PN codes are not duplicated, the selected temporary ID cell is allocated as an ID cell of the selected sector.

28 Claims, 10 Drawing Sheets

FIG.7

APPARATUS AND METHOD FOR ALLOCATING ID CELL TO AVOID PREAMBLE PSEUDO NOISE CODE DUPLICATION IN BROADBAND WIRELESS COMMUNICATION SYSTEM

CROSS-REFERENCE TO RELATED APPLICATION(S) AND CLAIM OF PRIORITY

The present application claims the benefit under 35 U.S.C. §119(a) of a Korean patent application filed in the Korean Intellectual Property Office on Nov. 10, 2008 and assigned Serial No. 10-2008-0110984, the entire disclosure of which is hereby incorporated by reference.

TECHNICAL FIELD OF THE INVENTION

The present invention relates to an apparatus and a method for allocating an Identification (ID) cell to avoid preamble Pseudo Noise (PN) code duplication in a broadband wireless communication system. More particularly, the present invention relates to an apparatus and a method for allocating an ID cell to minimize ID cell duplication between adjacent sectors, and simultaneously, to minimize preamble PN code duplication determined by the ID cell.

BACKGROUND OF THE INVENTION

An Institute of Electrical and Electronics Engineers (IEEE) 802.16e system employs a cellular scheme basically, and can use the same frequency between adjacent cells because the IEEE 802.16e system supports a frequency reuse coefficient 1. Therefore, a terminal inside the system should discriminate between a sector to which the terminal itself belongs and an adjacent sector among sectors that use the same frequency. For this purpose, each sector conveys a PN code of its own on a preamble, which is a first symbol of each frame transmitted to a terminal, and transmits the same.

A total of 114 preamble PN codes are defined in the IEEE 802.16e system standard, and each code has a code index ranging from 0 to 113. Additionally, the preamble PN code has an ID cell and a segment number. Therefore, a terminal may determine the code index, the ID cell, and the segment number by parsing the preamble PN code. Here, the ID cell has one of 32 values ranging from '0' to '31,' and the segment number has one of 3 values ranging from '0' to '2.' Therefore, all codes cannot have unique combination (of an ID cell and a segment number). Only each code ranging from a code No. '0' to a code No. '95' of the 114 codes has unique combination (of an ID cell and a segment number). Codes ranging from a code No. '96' to a code No. '113' have the same combinations (of an ID cell and a segment number) as those of the code No. '0' to the code No. '95.'

When the preamble PN code is duplicated (same) and used between adjacent sectors, an initial cell search and cell acquisition are impossible. Additionally, sector recognition cannot be made even during a handover. Therefore, adjacent sectors should avoid using the same preamble PN code. Even when duplication of 32 ID cells themselves is simply avoided, duplication of 114 preamble PN codes may occur. Therefore, ID cells should be allocated such that duplication of preamble PN codes between adjacent sectors is minimized in order to prevent a problem in sector discrimination during initial cell search and cell acquisition, and a handover.

In the IEEE 802.16e system, the ID cell is used for various purposes, which has an important influence on the performance of the system. Functions of the ID cell are described below.

The ID cell is used for subchannel permutation in a first downlink Partial Usage of Sub-Channels (PUSC) zone.

The ID cell is used for downlink scrambling together with a segment in the first downlink PUSC zone.

The ID cell is used for uplink scrambling together with a frame number in an uplink.

The purpose of the conventional ID cell allocation method is to minimize a duplication degree of available ID cells considering only the functions of the ID cell. However, as described above, the ID cell is used as an element forming a preamble PN code, and a duplication degree of the preamble PN code should be also minimized. Therefore, an ID cell allocation method for minimizing ID cell duplication between adjacent sectors, and simultaneously, minimizing duplication of a preamble PN code determined by an ID cell is required.

SUMMARY OF THE INVENTION

To address the above-discussed deficiencies of the prior art, it is a primary an aspect of the present invention is to address at least the above-mentioned problems and/or disadvantages and to provide at least the advantages described below. Accordingly, an aspect of the present invention is to provide an apparatus and a method for allocating an ID cell to avoid duplication of a preamble PN code in a broadband wireless communication system.

Another aspect of the present invention is to provide an apparatus and a method for allocating an ID cell to minimize duplication of the ID cell between adjacent sectors, and simultaneously, to minimize duplication of a preamble PN code determined by the ID cell in a broadband wireless communication system.

In accordance with an aspect of the present invention, a method for allocating an Identification (ID) cell in a wireless communication system is provided. The method includes: selecting one sector inside the wireless communication system; selecting a temporary ID cell for the selected sector; determining whether an ID cell of a sector to which the ID cell has been already allocated inside a minimum unit group for ID cell allocation is the same as the temporary ID cell; determining whether Pseudo Noise (PN) codes of sectors inside a neighbor list of the selected sector are the same as temporary PN codes determined using the temporary ID cell; and when the temporary ID cell is not duplicated and the temporary PN codes are not duplicated, allocating the selected temporary ID cell as an ID cell of the selected sector.

In accordance with another aspect of the present invention, an apparatus for allocating an Identification (ID) cell in a wireless communication system is provided. The apparatus includes: a sector selector configured to select one sector inside the system; a temporary ID cell selector configured to select a temporary ID cell for the selected sector; a temporary ID cell duplication determination unit configured to determine whether an ID cell of a sector to which the ID cell has been already allocated inside a minimum unit group for ID cell allocation is the same as the temporary ID cell, and determine whether Pseudo Noise (PN) codes of sectors inside a neighbor list of the selected sector are the same as temporary PN codes determined using the temporary ID cell; and an ID cell allocation unit configured to, when the temporary ID cell is not duplicated and the temporary PN codes are not duplicated, allocate the selected temporary ID cell as an ID cell of the selected sector.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication terminal. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for allocating an ID cell to minimize duplication of the ID cell between adjacent sectors, and simultaneously, to minimize duplication of a preamble PN code determined by the ID cell in a broadband wireless communication system.

Though exemplary embodiments of the present invention are described using allocation of an ID cell as an example, the exemplary embodiments of the present invention are effectively applicable to allocation of a DownLink (DL)_PermBase and an UpLink (UL)_PermBase, which are other sector discrimination parameters used for a broadband wireless communication system.

An exemplary embodiment of the present invention includes the following items.

A method for determining proximity between sectors.

A method for determining a minimum unit group for ID cell allocation.

A method for determining a purpose equation of ID cell allocation.

A method for allocating an ID cell.

Exemplary embodiments of the present invention define that a base station includes one or more (for example, three) sectors. To determine costs for the case where an ID cell is duplicated between sectors, proximity between the sectors should be defined, and an amount of interference of a sector i to a sector j is defined as proximity of the sector i with respect to the sector j, and called Prox_ij. The Prox_ij may be determined in various methods. For example, in the case of using a network planning tool, a total amount of influence of a sector j on a sector i may be determined as the Prox_ij. In the case where only distance information between sectors exists, a path loss value between a sector i and a sector j may be determined as the Prox_ij. Besides, various methods may be used. An exemplary embodiment of the present invention determines the Prox_ij using an apparatus and a method of FIGS. 1 and 2 below.

Figure 1:
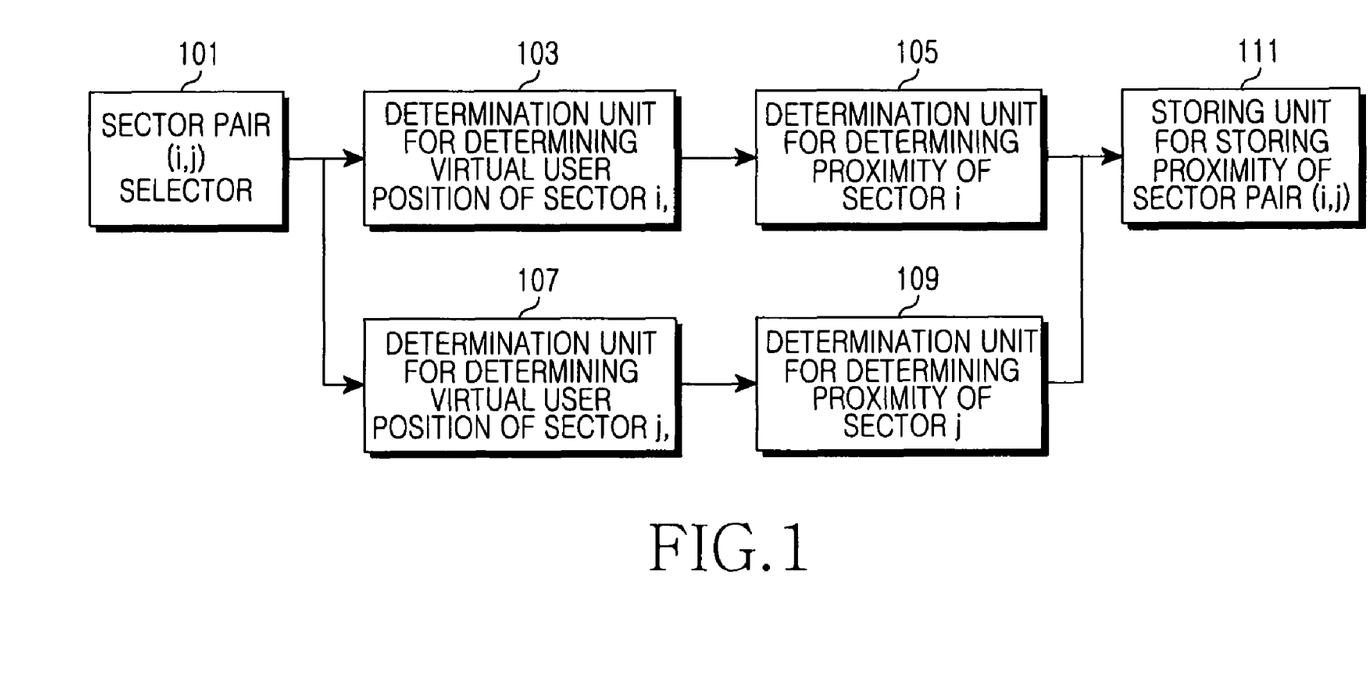
FIG. 1 illustrates a block diagram for a proximity determination unit for determining proximity between sectors in a broadband wireless communication system according to an exemplary embodiment of the present invention.

FIG. 1 illustrates a block diagram for a proximity determination unit for determining proximity between sectors in a broadband wireless communication system according to an exemplary embodiment of the present invention.

As illustrated, the proximity determination unit includes a sector pair (i, j) selector 101, a determination unit 103 for determining a virtual user position of a sector i, a determination unit 105 for determining proximity of a sector i, a determination unit 107 for determining a virtual user position of a sector j, a determination unit 109 for determining proximity of a sector j, and a storing unit 111 for storing proximity of a sector pair (i, j).

Referring to FIG. 1, the sector pair (i, j) selector 101 for selecting a sector pair (i, j) selects an arbitrary sector pair (i, j) whose proximity has not been determined from sector pairs, and then outputs the selected sector pair (i, j) to the determination unit 103 for determining a virtual user position of the sector i, and the determination unit 107 for determining a virtual user position of the sector j.

The determination unit 103 for determining a virtual user position of the sector i determines a virtual user position representing the sector i using the sector pair (i, j) input from the sector pair (i, j) selector 101 for selecting the sector pair (i, j), and di, and outputs the determined virtual user position to the determination unit 105 for determining proximity of the sector i. Here, a distance from a base station of the sector to a nearest base station is defined as di. Here, it is assumed that a virtual user representing the sector i is positioned at a distance of di in a direction of an antenna main lobe of the sector i, a distance of di in a direction of the antenna main lobe of the sector i+a direction of an antenna beamwidth/2 degree, and a distance of di in a direction of the antenna main lobe of the sector i−a direction of the antenna beamwidth/2 degree.

The determination unit 105, that is configured to determine proximity of a sector i, determines proximity Prox_ij of the sector i with respect to the sector j using the determined virtual user position of the sector i, and outputs the determined Prox_ij to the storing unit 111 for storing proximity of the sector pair (i, j). Here, a largest path loss value of path loss values between the sector j and the determined three virtual user positions of sector i, is determined as Prox_ij. That is, a path loss value of highest proximity is determined as Prox_ij. At this point, an azimuth angle of the antenna, an antenna pattern, and transmission power of the sector i should be considered.

The determination unit 107, that determines a virtual user position of the sector j, determines a virtual user position representing the sector j using the sector pair (i, j) input from the sector pair (i, j) selector 101 for selecting the sector pair (i, j), and dj, and outputs the determined virtual user position to the determination unit 109 for determining proximity of the sector j. Here, a distance from a base station of the sector j to a nearest base station is defined as dj. Further, it is assumed that a virtual user representing the sector j is positioned at a distance of dj in a direction of an antenna main lobe of the sector j, a distance of dj in a direction of the antenna main lobe of the sector j+a direction of an antenna beamwidth/2 degree, and a distance of dj in a direction of the antenna main lobe of the sector j−a direction of the antenna beamwidth/2 degree.

The determination unit 109, that determines proximity of a sector j, determines proximity Prox_ji of the sector j with respect to the sector i using the determined virtual user position of the sector j, and outputs the determined Prox_ji to the storing unit 111 for storing proximity of the sector pair (i, j). Here, a largest path loss value, of path loss values between the sector i and the determined three virtual user positions of sector j, is determined as Prox_ji. That is, a path loss value of highest proximity is determined as Prox_ji. At this point, an azimuth angle of the antenna, an antenna pattern, and transmission power of the sector j should be considered.

The storing unit 111, that stores proximity of the sector pair (i, j), determines a larger value of Prox_ij and Prox_ji input from the determination unit 105 that determines proximity of the sector i and the determination unit 109 that determines proximity of the sector j, as proximity of the sector pair (i, j), and stores the determined proximity of the sector pair (i, j).

Figure 2:
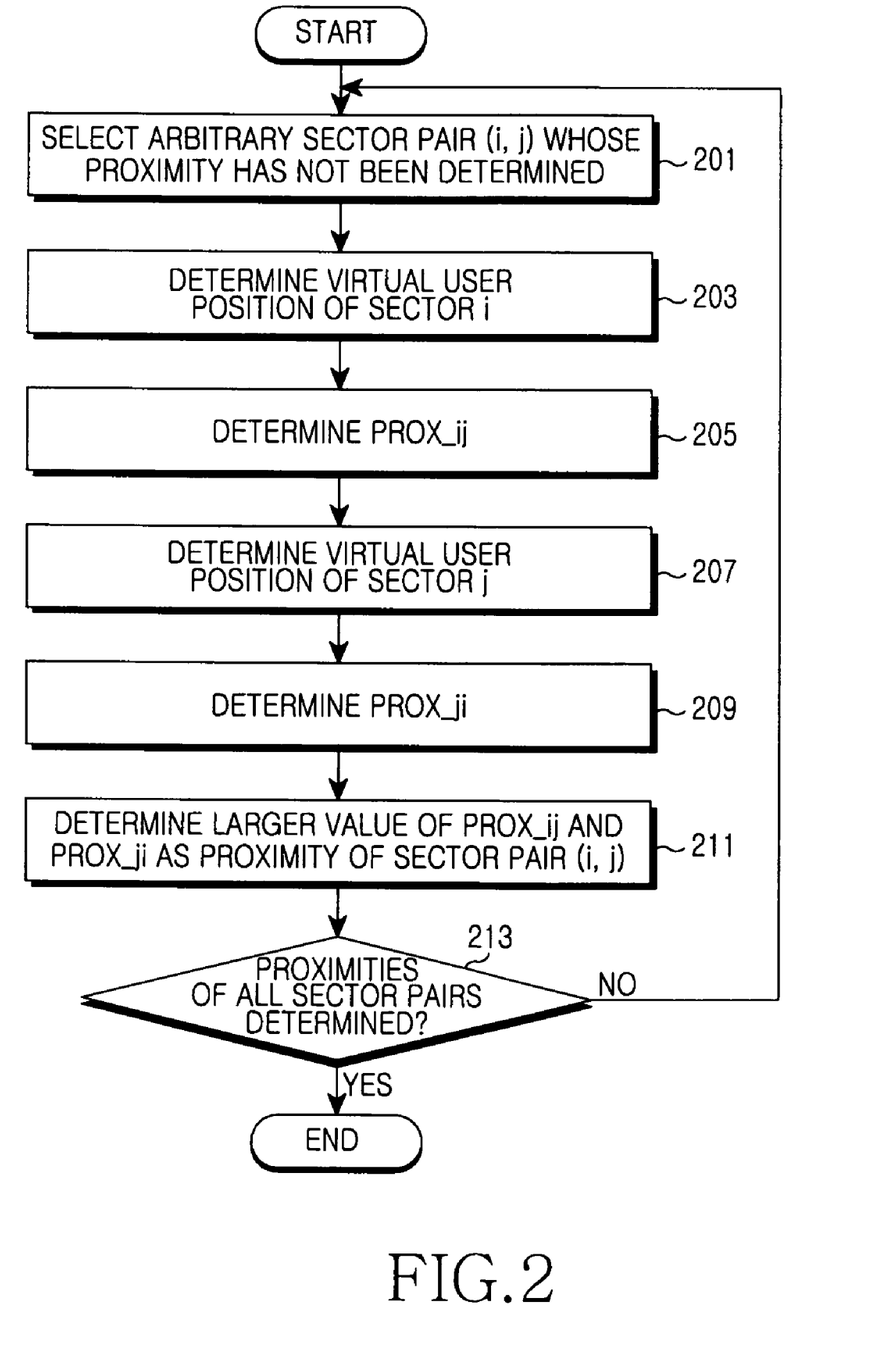
FIG. 2 illustrates a flowchart for a method for determining proximity between sectors in a broadband wireless communication system according to an exemplary embodiment of the present invention.

FIG. 2 illustrates a flowchart for a method for determining proximity between sectors in a broadband wireless communication system according to an exemplary embodiment of the present invention.

Referring to FIG. 2, a proximity determination unit, that determines proximity, selects an arbitrary sector pair (i, j) whose proximity has not been determined from sector pairs in step 201, and determines a virtual user position representing the sector i in step 203. Here, it is assumed that a virtual user representing the sector i is positioned at a distance of di in a direction of an antenna main lobe of the sector i, a distance of di in a direction of the antenna main lobe of the sector i+a direction of an antenna beamwidth/2 degree, and a distance of di in a direction of the antenna main lobe of the sector i−a direction of the antenna beamwidth/2 degree. Here, a distance from a base station of the sector i to a nearest base station is defined as di.

The proximity determination unit determines proximity Prox_ij of the sector i with respect to the sector j using the determined virtual user position of the sector i in step 205. Here, a largest path loss value of path loss values between the sector j and the determined three virtual user positions of sector i, is determined as Prox_ij. That is, a path loss value of highest proximity is determined as Prox_ij. At this point, an azimuth angle of the antenna, an antenna pattern, and transmission power of the sector i should be considered.

The proximity determination unit determines a virtual user position representing the sector j using the same method as in the sector i in step 207. Here, it is assumed that a virtual user representing the sector j is positioned at a distance of dj in a direction of an antenna main lobe of the sector j, a distance of dj in a direction of the antenna main lobe of the sector j+a direction of an antenna beamwidth/2 degree, and a distance of dj in a direction of the antenna main lobe of the sector j−a direction of the antenna beamwidth/2 degree. Here, a distance from a base station of the sector j to a nearest base station is defined as dj.

The proximity determination unit determines proximity Prox_ji of the sector j with respect to the sector i using the determined virtual user position of the sector j in step 209. Here, a largest path loss value of path loss values between the sector i and the determined three virtual user positions of sector j, is determined as Prox_ji. That is, a path loss value of highest proximity is determined as Prox_ji. At this point, an azimuth angle of the antenna, an antenna pattern, and transmission power of the sector j should be considered.

The proximity determination unit determines a larger value of the determined Prox_ij and Prox_ji as proximity of the sector pair (i, j) in step 211.

The proximity determination unit determines whether proximities of all sector pairs inside the system have been determined in step 213. When the proximities of all the sector pairs have not been determined, the proximity determination unit returns to step 201. In contrast, when the proximities of all the sector pairs have been determined, the proximity determination unit ends the process according to an exemplary embodiment of the present invention.

Figure 3A:
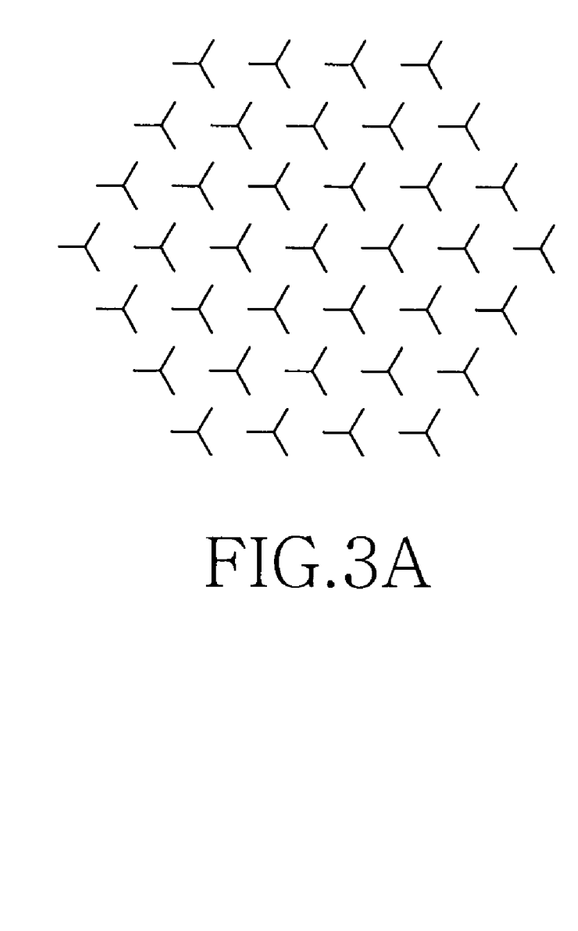
FIGS. 3A and 3B illustrate an exemplary view for an arrangement of an ideal 3-sector base station and an arrangement of an actual 3-sector base station.
Figure 3B:
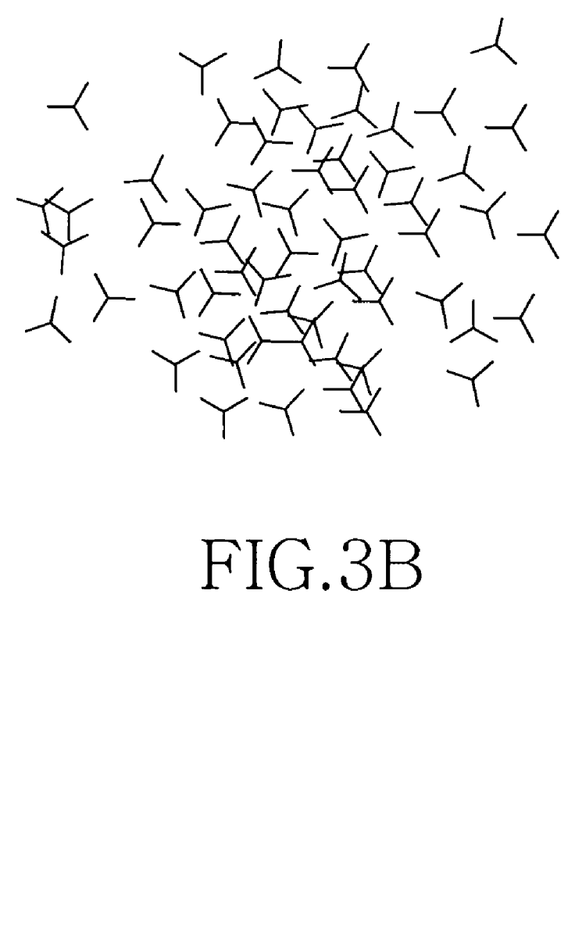

The number of maximum available resources of ID cells is 32. Therefore, to make a maximum reuse of 32 ID cells, the 32 ID cells need to be bound in a group and managed. FIGS. 3A and 3B illustrating an arrangement of an ideal 3-sector base station and an arrangement of an actual 3-sector base station. In the case of the arrangement of the ideal 3-sector base station illustrated in FIG. 3A, 7 base stations including a self base station and 21 sectors are arranged in 1 tier. In the case of 2 tiers, 12 base stations are additionally arranged, so that a total of 19 base stations and 57 sectors are arranged. Of course, an arrangement of actual base stations does not conform to a normal arrangement as illustrated in FIG. 3B, but it is impossible that all sectors arranged in 2 tiers avoid duplication of ID cells whose the number of maximum available resources are 32. Therefore, only 1 tier is considered as a basis of a minimum reuse for ID cell allocation. Duplication of an ID cell of a base station directly adjacent to a base station is avoided by determining a range called 1 tier as a minimum reuse basis as described above. A minimum unit group in which directly adjacent base stations are bound so that ID cells may not be duplicated is defined as a '1 tier group'.

Here, N base stations of maximum proximity excluding a self base station with respect to K sectors inside an arbitrary base station (base station of a sector i) serving as a reference of the 1 tier group, are determined as the 1 tier group. At this point, N is selected based on Equation 1, so that the number of sectors included in a 1 tier group may not exceed the number of maximum available ID cells (that is, 32).

$$\sum_{j=1}^{K}\sum_{i=1}^{N}(\text{Count\_High\_Proximity\_Sectors})_{ji} -$$

$$\text{Count\_Duplicated\_Sectors} + (K - 1) \leq \text{Max\_Available\_IDcell}$$

[Eqn. 1]

where K is the number of sectors of an arbitrary base station (base station of a sector i) serving as a reference of a 1 tier group, N is a proximity ranking excluding a self base station with respect to an arbitrary base station (base station of a sector i) serving as a reference of a 1 tier group. Generally, N has a value of 3 or more in order to include neighbor adjacent base stations inside a 1 tier group. (Count_High_ Proximity_Sectors)$_{ji}$ is the number of sectors of a base station of an i-th proximity ranking with respect to a j-th sector of an arbitrary base station (base station of a sector i) serving as a reference of a 1 tier group, Count_Duplicated_Sectors is a duplicated base station of maximum proximity. That is, since a base station of maximum proximity of one sector inside an arbitrary base station serving as a reference of the 1 tier group may be the same as a base station of maximum proximity of another sector, the duplicated base station is excluded. (K−1) is the number of the rest of sectors excluding a sector i of an arbitrary base station (base station of sector i). Max_Available_IDcell is the number of maximum available resources of ID cells, that is, 32.

For example, when N is 3, and results obtained by aligning adjacent sectors in the order of high proximity with respect to an arbitrary sector i using the determined proximity are given as in Table 1, and three base stations corresponding to adjacent sectors of highest proximity (sector 1-A, sector 1-B, sector 2-B, sector 3-C) are a base station 1, a base station 2, and a base station 3. At this point, regardless of the number of adjacent sectors of highest proximity, adjacent three base stations are selected according to proximity. Likewise, three base stations of highest proximity are selected using the same method with respect to another sector included in a base station of a sector i. When three base stations are selected for each sector as described above, nine base stations are selected at the maximum. Therefore, in the case of arrangement of a 3-sector base station, a total of 29 sectors (that is, 9 base stations×3=27, 2 sectors of a self base station) may be included at the maximum in a 1 tier group. Here, since three base stations of highest proximity in one sector may be already included in three base stations of highest proximity in another sector, the number of sectors included in the 1 tier group may be 29 or less.

TABLE 1

| Adjacent sector index | Adjacent base station index |
|---|---|
| sector 1-A | base station 1 |
| sector 1-B | base station 1 |
| sector 2-B | base station 2 |
| sector 3-C | base station 3 |
| sector 4-C | base station 4 |
| sector 1-C | base station 1 |
| sector 2-A | base station 2 |
| sector 5-B | base station 5 |
| sector 2-C | base station 2 |
| ... | ... |

In the case of arrangement of 3-sector base station, N should be 3 or more in order to include neighbor adjacent base stations inside a 1 tier group in general. However, in the case of arrangement of 4-sector or 6-sector base station, N may be reduced to less than 3 in order to define a 1 tier group as 'N base stations of highest proximity with respect to respective K sectors inside an arbitrary base station serving as a reference of a 1 tier group, as described above. In this case, it is more reasonable to incorporate neighborhood of a self sector into the 1 tier group on the first place by reducing a K value rather than reducing an N value. That is, to prevent ID cell duplication at a directly adjacent base station, N base stations of highest proximity are selected in the order of high proximity from the self sector on the first place. Thereafter, a sector of highest proximity with respect to the self sector is determined from other sectors inside a base station of the self sector. Thereafter, N base stations of highest proximity are selected in the order of high proximity from the determined sector. A 1 tier group is determined such that the number of sectors included inside the 1 tier group does not exceed the number of maximum available ID cells (that is, 32) by repeating the above-described process. An exemplary embodiment of the present invention determines a 1 tier group, that is, a minimum unit group for ID cell allocation as described above. Hereinafter, a method for determining a minimum unit group of an apparatus for determining the minimum unit group is described with reference to FIG. 4.

Figure 4:
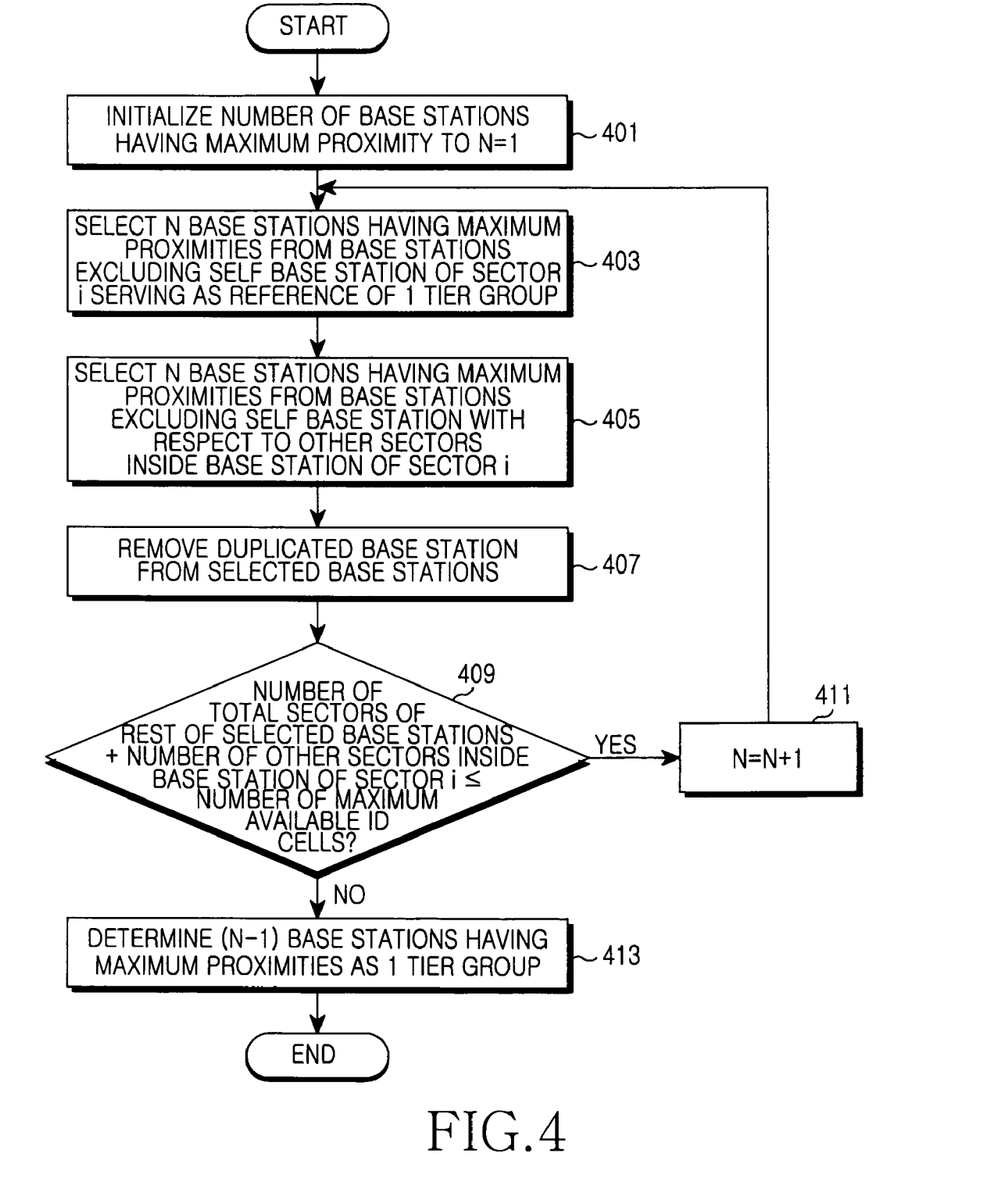
FIG. 4 illustrates a flowchart for a method for determining a minimum unit group for ID cell allocation in a broadband wireless communication system according to an exemplary embodiment of the present invention.

FIG. 4 illustrates a flowchart illustrating a method for determining a minimum unit group for ID cell allocation in a broadband wireless communication system according to an exemplary embodiment of the present invention.

Referring to FIG. 4, a minimum unit group determination unit for determining the minimum unit group initializes N, which is the number of base stations having maximum proximity, to 1 in step 401.

The minimum unit group determination unit selects N base stations of maximum proximity from base stations excluding a self base station with respect to a sector i serving as a reference of a 1 tier group in step 403, and selects N base stations of maximum proximity from base stations excluding the self base station with respect to other sectors inside a base station of the sector i in step 405.

The minimum unit group determination unit removes a duplicated base station from the selected base stations in step 407.

The minimum unit group determination unit determines a sum of the number of total sectors of the rest of base stations in which the duplicated base station has been removed from the selected base stations, and the number of other sectors inside a base station of the sector i; and determines whether the determined sum is equal to or smaller than the number of maximum available ID cells in step 409.

When the determined sum is equal to or smaller than the number of maximum available ID cells, the minimum unit group determination unit replaces N by (N+1) in step 411, and returns to step 403 to repeatedly perform subsequent steps. In contrast, when the determined sum is greater than the number of maximum available ID cells, the minimum unit group determination unit determines (N−1) base stations of maximum proximity as a 1 tier group in step 413.

Thereafter, the minimum unit group determination unit ends the algorithm according to an exemplary embodiment of the present invention.

As described above, when proximity between sectors is determined, and a minimum unit group for ID cell allocation is determined, an ID cell may be allocated using the determined proximity between sectors and the determined minimum unit group. In an exemplary embodiment of the present invention, an ID cell is determined using an apparatus and a method of FIGS. 5, 6A, 6B, 6C and 6D.

At this point, a purpose equation for allocating ID cell is given below. That is, duplication of an ID cell is minimized inside a 1 tier group, and a frequency of duplication occurrence of a PN code on a neighbor list is minimized. The following assumption is used to allocate an ID cell such that the purpose equation is met.

Frequency Reuse Pattern (FRP) 1 assumption (worst case)
Before ID cell allocation, a segment is already allocated with respect to all sectors to be allocated.
Before ID cell allocation, a neighbor list is already determined.
(According to a current standard, 32 neighbor lists are possible)
Before ID cell allocation, proximity between sectors is already determined.
Allocation of PN codes ranging from 0 to 95 having a unique combination of (ID cell, segment) is considered. After final ID cell allocation, when duplication of a PN code is inevitable on a neighbor list, a PN code is allocated using a possible value of PN codes ranging from 96 to 113 depending on an ID cell and a segment.

Figure 5:
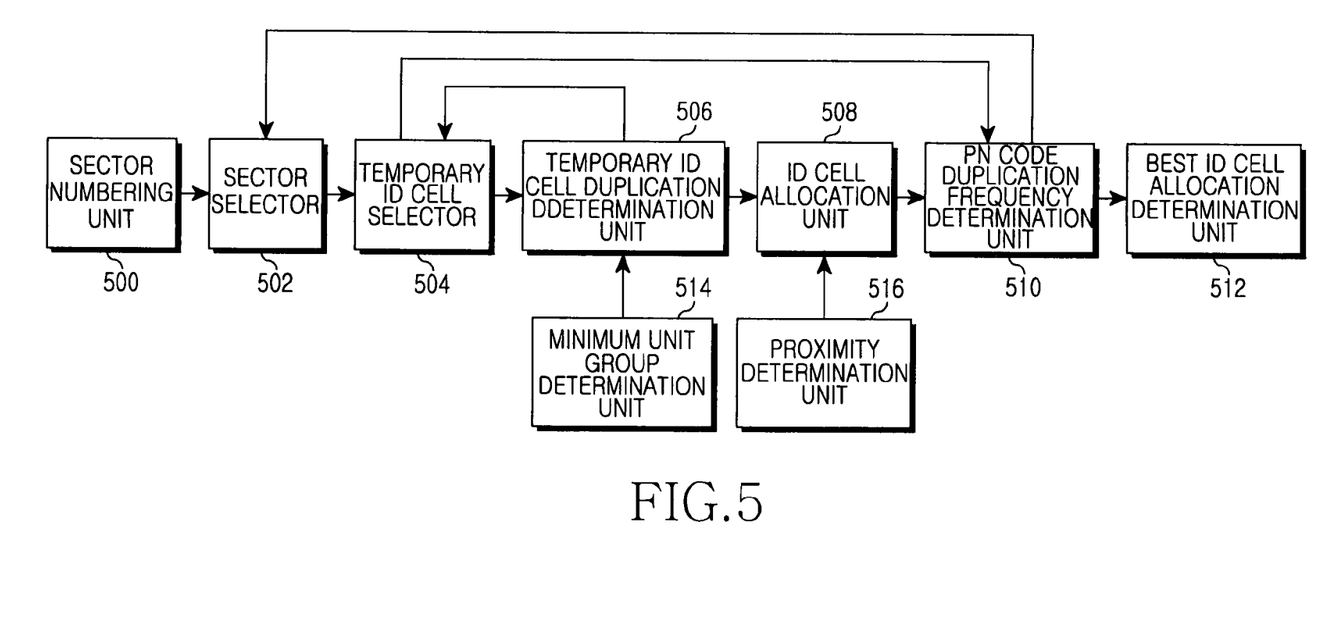
FIG. 5 illustrates a block diagram for an apparatus for allocating an ID cell in a broadband wireless communication system according to an exemplary embodiment of the present invention.
Figure 6A:
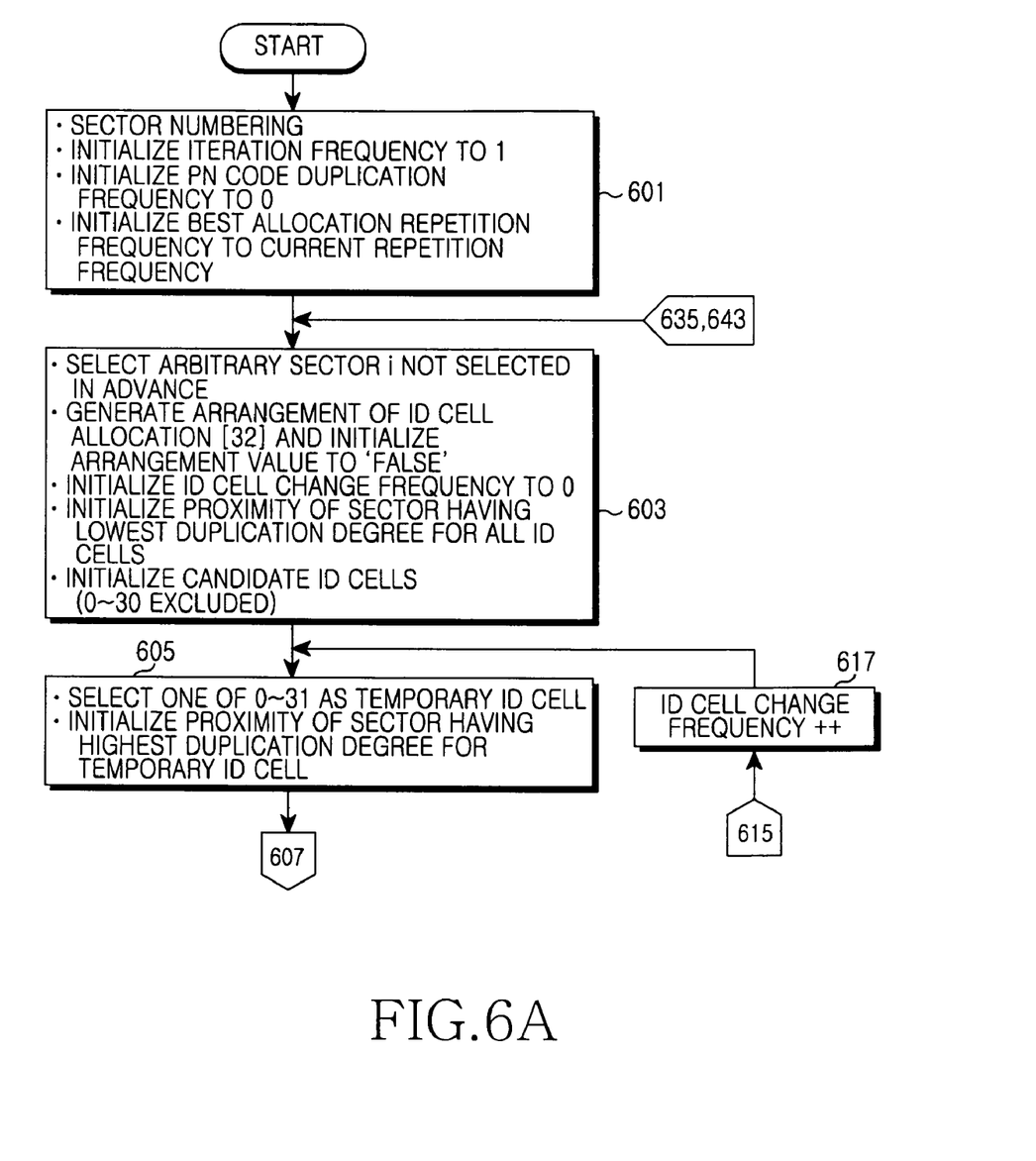
FIGS. 6A, 6B, 6C and 6D illustrate flowcharts for a method for allocating an ID cell in a broadband wireless communication system according to an exemplary embodiment of the present invention.
Figure 6B:
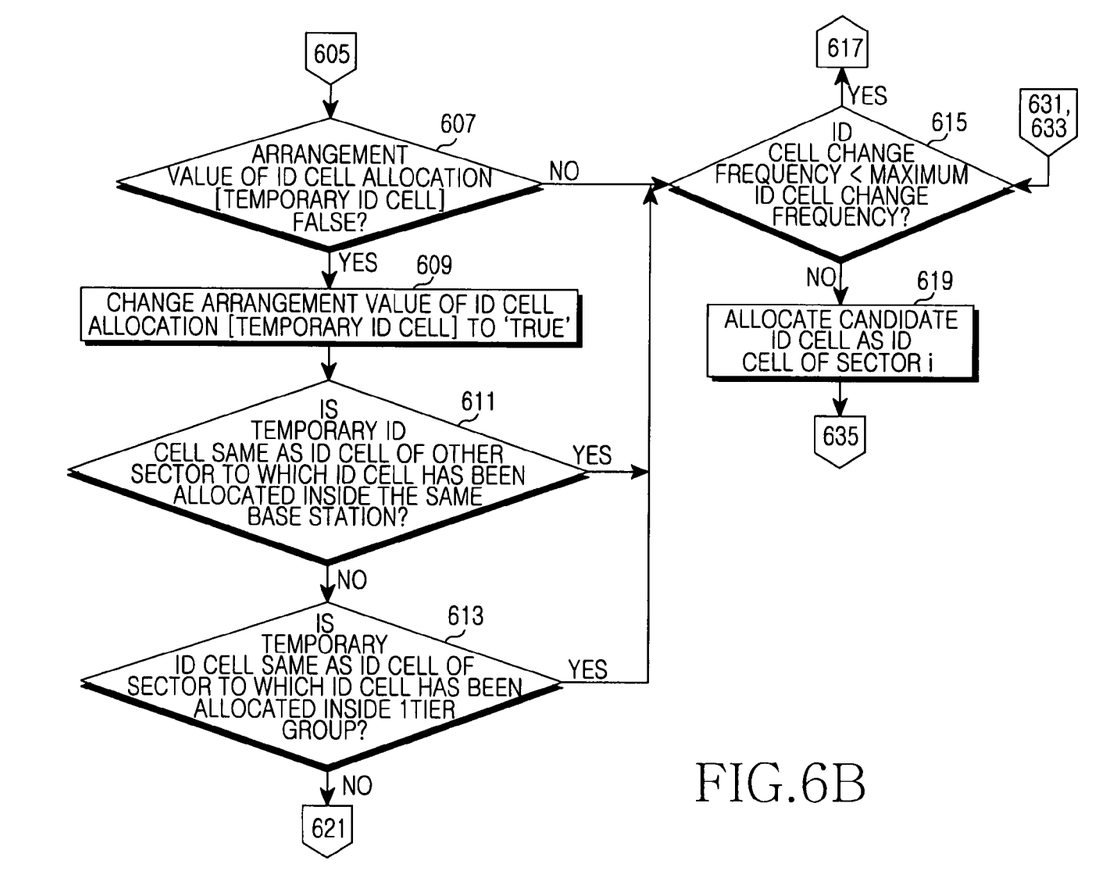
Figure 6C:
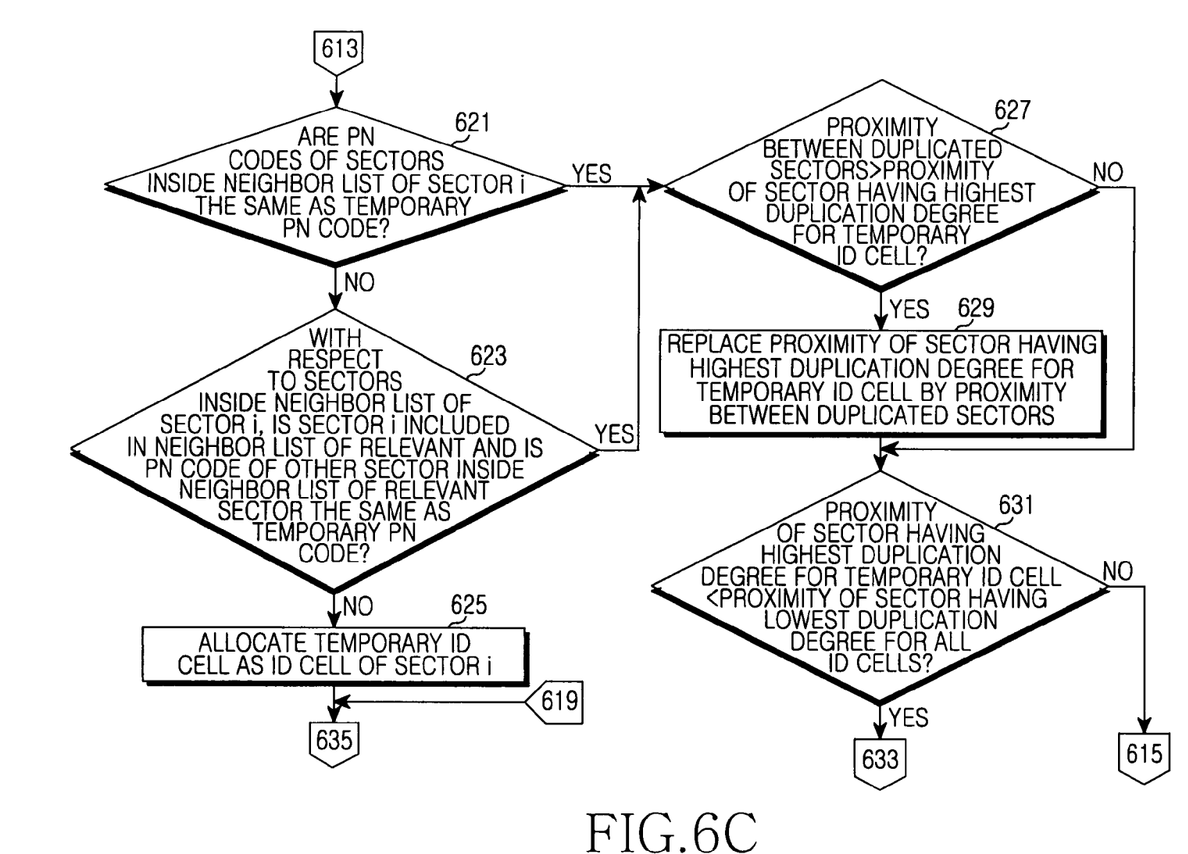
Figure 6D:
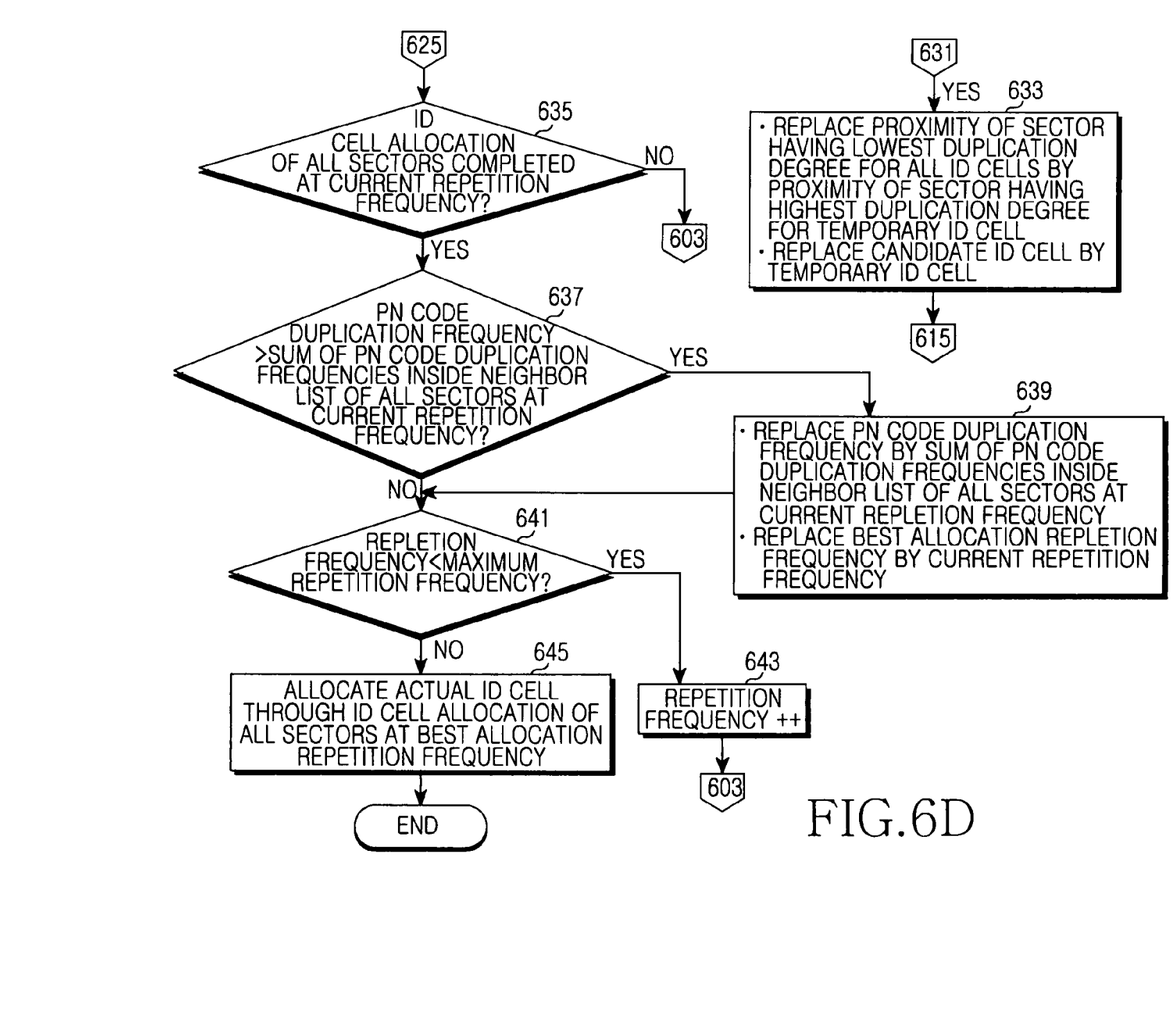
Figure 7:
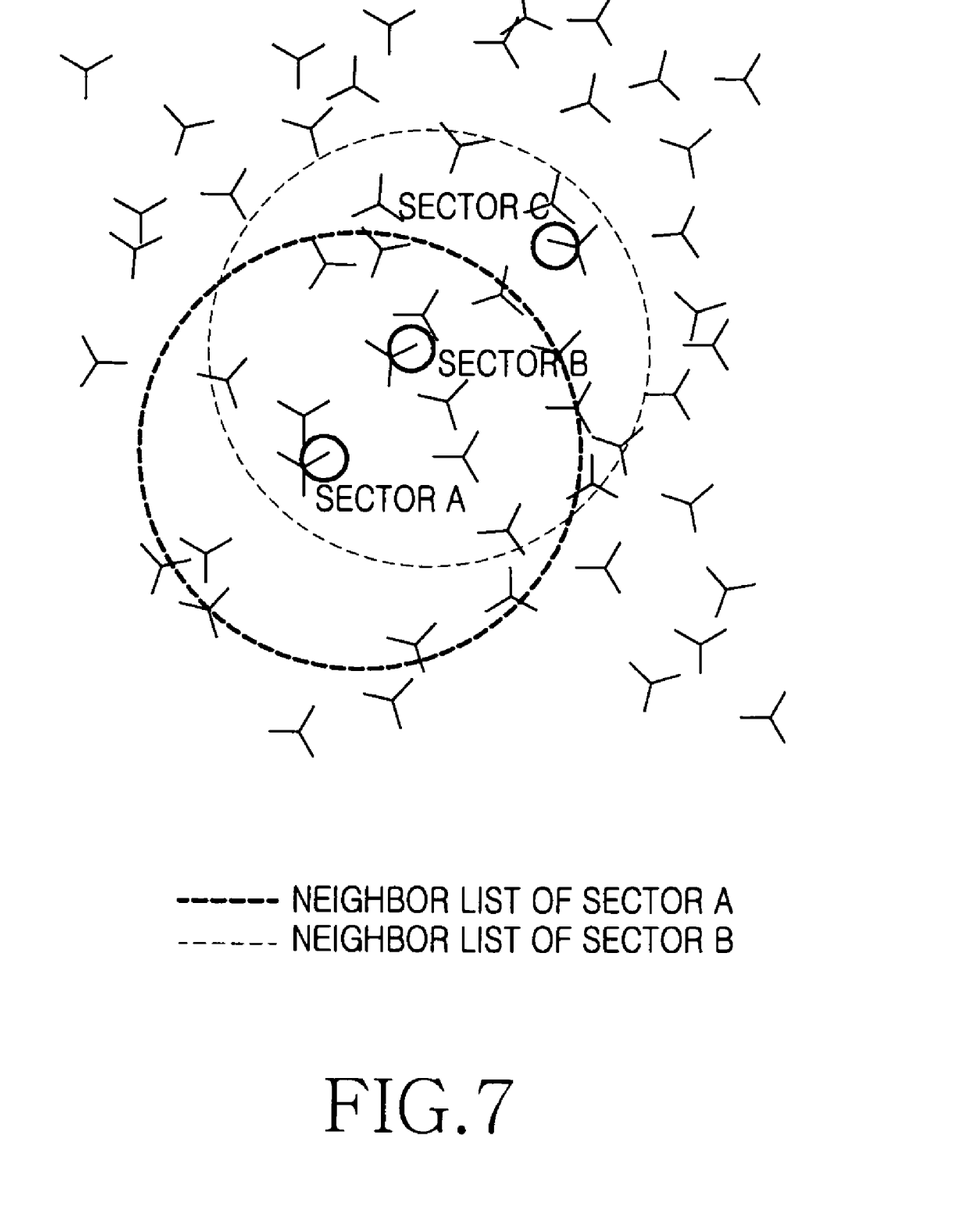
FIG. 7 illustrates an exemplary view for a problem occurring when determining only whether PN codes of sectors inside a neighbor list of a sector i is the same as temporary PN codes of the sector i.

FIG. 5 illustrates a block diagram illustrating an apparatus for allocating an ID cell in a broadband wireless communication system according to an exemplary embodiment of the present invention.

As illustrated in FIG. 5, the apparatus includes a sector numbering unit 500, a sector selector 502, a temporary ID cell selector 504, a temporary ID cell duplication determination unit 506, an ID cell allocation unit 508, a PN code duplication frequency determination unit 510, a best ID cell allocation determination unit 512, a minimum unit group determination unit 514, and a proximity determination unit 516.

Referring to FIG. 5, the sector numbering unit 500 arbitrarily performs a numbering operation on all sectors including a sector to which an ID cell has been already allocated.

The sector selector 502 selects an arbitrary sector i not selected in advance. At this point, the sector i is selected in the order of numbering.

The temporary ID cell selector 504 selects one of ID cell values ranging from '0' to '31' as a temporary ID cell of the sector i.

The temporary ID cell duplication determination unit 506 determines whether an ID cell of a other sector to which the ID cell has been allocated inside a base station which is the same as a base station of the sector i is the same as the selected temporary ID cell. Additionally, the temporary ID cell duplication determination unit 506 determines whether an ID cell of a sector to which the ID cell has been allocated inside a 1 tier group of the sector i is the same as the selected temporary ID cell. Further, the temporary ID cell duplication determination unit 506 determines a temporary PN code [temporary ID cell, segment] using the selected temporary ID cell, and determines whether PN codes of sectors inside a neighbor list of the sector i are the same as the determined temporary PN code. Furthermore, the temporary ID cell duplication determination unit 506 determines whether the sector i is included in a neighbor list of a relevant sector with respect to sectors inside the neighbor list of the sector i, and determines whether a PN code of a other sector inside a neighbor list of a relevant sector is the same as the determined temporary PN code. When duplication of the temporary ID cell occurs as a result of the determination, the temporary ID cell duplication determination unit 506 allows the temporary ID cell selector 504 to change the temporary ID cell and select the same with respect to the selected sector. At this point, when the frequency of the temporary ID cell change is equal to or greater than the frequency of maximum ID cell change, the temporary ID cell duplication determination unit 506 allows the ID cell allocation unit 508 to allocate a candidate ID cell as an ID cell of the selected sector.

The ID cell allocation unit 508 allocates a temporary ID cell that has been determined as not being duplicated by the temporary ID cell duplication determination unit 506, as an ID cell of the sector i. Additionally, the ID cell allocation unit 508 selects a sector of highest proximity to the selected sector from sectors where duplication of the temporary PN code occurs, and sets proximity thereof as proximity to a sector having a highest duplication degree with respect to the temporary ID cell. When duplication occurs for all temporary ID cells of the selected sector, the ID cell allocation unit 508 compares proximities to a sector having a highest duplication degree, which are set for each temporary ID cell, and sets a temporary ID cell having lowest proximity as an ID cell of the selected sector.

When allocation of ID cells to all sectors inside the system is completed, the PN code duplication frequency determination unit 510 determines the sum of the frequencies of PN code duplication inside a neighbor list of all the sectors.

The best ID cell allocation determination unit 512 repeats a process for allocating an ID cell to all the sectors inside the system by a predetermined number of times, and determines ID cell allocation of a case where sum of PN code duplication frequencies inside a neighbor list of the determined all sectors is lowest, as best ID cell allocation.

The minimum unit group determination unit 514 determines a predetermined number of base stations having maximum proximity excluding a self base station, as a minimum unit group for ID cell allocation with respect to each sector inside a base station of the selected sector.

The proximity determination unit 516 determines proximity of a sector pair inside the system using an apparatus and a method of FIGS. 1 and 2.

FIGS. 6A, 6B, 6C and 6D are flowcharts illustrating a method for allocating an ID cell in a broadband wireless communication system according to an exemplary embodiment of the present invention.

Referring to FIGS. 6A, 6B, 6C and 6D, an apparatus for allocating the ID cell arbitrarily performs a numbering operation on all sectors including a sector to which an ID cell has been already allocated in step 601. At this point, the numbering order is not important. For example, the numbering operation may be performed in the order of a sector position or a sector name. Additionally, the apparatus initializes an iteration frequency to '1,' initializes a PN code duplication frequency to '0,' and initializes a best allocation repetition frequency to a current repetition frequency.

The apparatus selects an arbitrary sector i not selected in advance in step 603. At this point, the apparatus selects the sector i in the order of numbering. Additionally, the apparatus generates arrangement of ID cell allocation [32] for the selected sector i, and initializes an arrangement value to 'false'. Further, the apparatus initializes an ID cell change frequency to '0,' initializes proximity of a sector having a lowest duplication degree for all ID cells, and initializes a candidate ID cell to an ID cell value excluding values ranging from '0' to '31.'

The apparatus selects one of ID cells ranging from '0' to '31' as a temporary ID cell of the sector i in step 605. At this point, the apparatus initializes proximity of a sector having a highest duplication degree for the temporary ID cell.

The apparatus determines whether an arrangement value of ID cell allocation [temporary ID cell] is 'false' in step 607. When the arrangement value of ID cell allocation [temporary ID cell] is 'true', the apparatus determines whether an ID cell change frequency is less than a maximum ID cell change frequency in step 615. When the ID cell change frequency is less than the maximum ID cell change frequency, the apparatus replaces the ID cell change frequency by (ID cell change frequency+1) in step 617, and returns to step 605 to repeatedly perform subsequent steps. In contrast, when the ID cell change frequency is not less than the maximum ID cell change frequency, the apparatus determines that it is impossible to allocate one of ID cells ranging from '0' to '31' to the sector i, and allocates the candidate ID cell as an ID cell of the sector i in step 619, and proceeds to step 635.

In contrast, when the arrangement value of ID cell allocation [temporary ID cell] is 'false' in step 607, the apparatus changes the arrangement value of the ID cell allocation [temporary ID cell] into 'true' in step 609, and determines whether an ID cell of a other sector to which the ID cell has been allocated inside a base station which is the same as a base station of the sector i is the same as the selected temporary ID cell in step 611. By doing so, in the case where a sector to which an ID cell has been already allocated exists inside a base station of the sector i to which an ID cell is to be allocated, duplication of an ID cell inside the same base station may be avoided. When an ID cell of a other sector to which an ID cell has been allocated inside a base station which is the same as a base station of the sector i is the same as the selected temporary ID cell, the apparatus returns to step 615 to repeatedly perform subsequent steps.

In contrast, when an ID cell of a other sector to which an ID cell has been allocated inside a base station that is the same as a base station of the sector i is not the same as the selected temporary ID cell in step 611, the apparatus determines whether an ID cell of a sector to which an ID cell has been allocated inside a 1 tier group of the sector i is the same as the selected temporary ID cell in step 613. In an exemplary embodiment of the present invention, the apparatus determines whether an ID cell of a sector to which the ID cell has been allocated inside a neighbor list of the sector i is the same as the selected temporary ID cell. By doing so, in the case where a sector to which an ID cell has been allocated exists inside a 1 tier group of the sector i to which an ID cell is to be allocated, duplication of an ID cell inside the same 1 tier group may be avoided. When an ID cell of a sector to which an ID cell has been allocated inside a 1 tier group of the sector i is the same as the selected temporary ID cell, the apparatus returns to step 615 to repeatedly perform subsequent steps.

When an ID cell of a sector to which an ID cell has been allocated inside a 1 tier group of the sector i is not the same as the selected temporary ID cell in step 613, the apparatus determines a temporary PN code [temporary ID cell, segment] using the selected temporary ID cell, and determines whether PN codes of sectors inside a neighbor list of the sector i are the same as the determined temporary PN code in step 621. By doing so, the apparatus may prevent the same PN code from being allocated to the neighbor list of the sector i. Here, a segment is a segment that has been already allocated to the sector i, and the PN code is determined using (segment× 32+temporary ID cell).

When PN codes of sectors inside a neighbor list of the sector i are the same as the determined temporary PN code in step 621, the apparatus determines whether proximity between sectors where a PN code is duplicated is greater than proximity of a sector having a highest duplication degree for the temporary ID cell with respect to the sectors inside the neighbor list of the sector i where PN codes are the same as the temporary PN code of the sector i in step 627. This is for selecting a sector having highest proximity to the sector i from sectors where duplication occurs, and setting proximity thereof as proximity for the temporary ID cell. By doing so, maximum proximities for respective ID cells may be compared with respect to all ID cells, and an ID cell having lowest maximum proximity may be allocated to the sector i.

When proximity between sectors where a PN code is duplicated is not greater than proximity of a sector having a highest duplication degree for the temporary ID cell, the apparatus immediately proceeds to step 631. In contrast, when proximity between sectors where a PN code is duplicated is greater than proximity of a sector having a highest duplication degree for the temporary ID cell, the apparatus replaces the proximity of the sector having the highest duplication degree for the temporary ID cell by the proximity between sectors where the PN code is duplicated in step 629, and proceeds to step 631. The apparatus determines whether the proximity of the sector having the highest duplication degree for the temporary ID cell is smaller than proximity of a sector having a lowest duplication degree for all the ID cells in step 631. By doing so, in the case where duplication inevitably occurs with respect to all ID cells, an ID cell having a lowest duplication degree may be selected and allocated from the ID cells.

When the proximity of the sector having the highest duplication degree for the temporary ID cell is not smaller than the proximity of the sector having the lowest duplication degree for all the ID cells, the apparatus immediately proceeds to step 615 to repeatedly perform subsequent steps. In contrast, when the proximity of the sector having the highest duplication degree for the temporary ID cell is smaller than the proximity of the sector having the lowest duplication degree for all the ID cells, the apparatus replaces the proximity of the sector having the lowest duplication degree for all the ID cells by the proximity of the sector having the highest duplication degree for the temporary ID cell, and replaces a candidate ID cell by the temporary ID cell in step 633, and proceeds to step 615 to perform subsequent steps.

In contrast, when PN codes of sectors inside a neighbor list of the sector i are not the same as the determined temporary PN code in step 621, the apparatus, with respect to sectors inside the neighbor list of the sector i, determines whether the sector i is included in a neighbor list of a relevant sector and whether a PN code of a other sector inside the neighbor list of the relevant sector is the same as the determined temporary PN code in step 623.

Here, in the case of determining only whether PN codes of sectors inside a neighbor list of the sector i are the same as the determined temporary PN code as in step 621, the following problem may be generated. The problem is described with reference to FIG. 7. In the case of allocating an ID cell to a sector A, a sector B may be included and a sector C may not be included on a neighbor list of the sector A, but the sector A and the sector C may be included on a neighbor list of the sector B. In this case, when only whether PN codes of sectors inside a neighbor list of the sector A are the same as the determined temporary PN code is determined, since the sector C is not included in a neighbor list of the sector A, whether a PN code of the sector A is the same as a PN code of the sector C is not determined. Therefore, when duplication of a PN code does not occur as a result of determining whether a PN code of the sector A is the same as a PN code of the sector B, a relevant PN code is allocated to the sector A. However, from the viewpoint of the sector B, duplication of the same PN code of the sector A and the sector C may occur on a neighbor list of the sector B. Therefore, to solve this problem, whether a PN code is duplicated between arbitrary sectors on a neighbor list should be determined as in step 623.

With respect to sectors inside the neighbor list of the sector i, when the sector i is included in a neighbor list of a relevant sector and a PN code of a other sector inside the neighbor list of the relevant sector is the same as the determined temporary PN code in step 623, the apparatus proceeds to step 627 to repeatedly perform subsequent steps. In contrast, with respect to sectors inside the neighbor list of the sector i, when the sector i is included in a neighbor list of a relevant sector and a PN code of a other sector inside the neighbor list of the relevant sector is not the same as the determined temporary PN code in step 623, the apparatus allocates the selected temporary ID cell as an ID cell of the sector i in step 625.

The apparatus determines whether ID cell allocation of all sectors at a current repetition frequency has been completed in step 635. When the ID cell allocation of all sectors at the current repetition frequency has not been completed, the apparatus returns to step 603 to repeatedly perform subsequent steps. In contrast, when the ID cell allocation of all sectors at the current repetition frequency has been completed, the apparatus determines whether a PN code duplication frequency is greater than sum of PN code duplication frequencies inside neighbor lists of all sectors at a current repetition frequency in step 637. When the PN code duplication frequency is not greater than sum of the PN code duplication frequencies inside neighbor lists of all sectors at the current repetition frequency, the apparatus immediately proceeds to step 641. In contrast, when the PN code duplication frequency is greater than sum of the PN code duplication frequencies inside the neighbor lists of all sectors at the current repetition frequency, the apparatus replaces the PN code duplication frequency by sum of the PN code duplication frequencies inside the neighbor lists of all sectors at the current repetition frequency, and replaces the best allocation repetition frequency by the current repetition frequency in step 639, and proceeds to step 641.

The apparatus determines whether the repetition frequency is less than a maximum repetition frequency in step 641. When the repetition frequency is less than the maximum repetition frequency, the apparatus replaces the repetition frequency by a number increasing by '1' in step 643, and returns to step 603 to repeatedly perform subsequent steps. In contrast, when the repetition frequency is not less than the maximum repetition frequency, the apparatus allocates an actual ID cell through ID cell allocation of all sectors at a current best allocation repetition frequency in step 645.

Thereafter, the apparatus ends the process according to an exemplary embodiment of the present invention.

As described above, an exemplary embodiment of the present invention addresses a problem that initial cell search and cell acquisition are impossible in the case where a preamble PN code is duplicated and used for adjacent sectors, and prevents system performance deterioration caused by duplication of an ID cell between adjacent sectors by providing an apparatus and a method for allocating an ID cell to minimize ID cell duplication between adjacent sectors, and simultaneously, to minimize preamble PN code duplication determined by the ID cell in a broadband wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for allocating an Identification (ID) cell in a wireless communication system, the method comprising:
   selecting one sector inside the wireless communication system;
   selecting a temporary ID cell for the selected sector;
   determining whether an ID cell of a sector to which the ID cell has been already allocated inside a minimum unit group for ID cell allocation is the same as the temporary ID cell;
   determining whether Pseudo Noise (PN) codes of sectors inside a neighbor list of the selected sector are the same as temporary PN codes determined using the temporary ID cell; and
   when the temporary ID cell is not duplicated and the temporary PN codes are not duplicated, allocating the selected temporary ID cell as an ID cell of the selected sector.

2. The method of claim 1, further comprising, when the duplication of the temporary ID cell occurs, changing the temporary ID cell for the selected sector, and selecting the changed ID cell.

3. The method of claim 2, further comprising, when a frequency of the changing of the temporary ID cell is equal to or greater than a maximum frequency of ID cell change, allocating a candidate ID cell as the ID cell of the selected sector.

4. The method of claim 3, wherein the temporary ID cell is one of ID cells ranging from 0 to 31, and the candidate ID cell is one of the rest of ID cells excluding the ID cells ranging from 0 to 31.

5. The method of claim 1, further comprising determining whether an ID cell of a other sector to which the ID cell has been already allocated inside a base station that is the same as a base station of the selected sector is the same as the temporary ID cell.

6. The method of claim 1, further comprising determining, with respect to the sectors inside the neighbor list of the selected sector, whether the selected sector is included in a neighbor list of a relevant sector, and whether a PN code of a other sector inside the neighbor list of the relevant sector is the same as the temporary PN code determined using the temporary ID cell.

7. The method of claim 1, further comprising:
   when ID cell allocation of all sectors inside the system is completed, determining sum of PN code duplication frequencies inside neighbor lists of all the sectors; and
   repeating a process of allocating an ID cell to all the sectors inside the system by a predetermined number of times to determine ID cell allocation of a case where the determined sum of the PN code duplication frequencies inside the neighbor lists of all the sectors is smallest, as best ID cell allocation.

8. The method of claim 1, further comprising:
   selecting a sector having highest proximity to the selected sector from sectors where duplication of the temporary PN code occurs, and setting proximity thereof as proximity of a sector having a highest duplication degree for the temporary ID cell; and when duplication of all temporary ID cells of the selected sector occurs, comparing proximities to a sector having a highest duplication degree, which are set for respective temporary ID cells, and allocating a temporary ID cell having lowest proximity as the ID cell of the selected sector.

9. The method of claim 8, wherein determining the proximity comprises:

selecting one sector pair (i, j) from sector pairs inside the system;

determining a virtual user position representing the sector i;

determining proximity of the sector i with respect to the sector j using the determined virtual user position of the sector i;

determining a virtual user position representing the sector j;

determining proximity of the sector j with respect to the sector i using the determined virtual user position of the sector j; and determining a larger value of the proximity of the sector i with respect to the sector j, and the proximity of the sector j with respect to the sector i, as proximity of the sector pair (i, j).

10. The method of claim 9, wherein a virtual user is positioned at least one of a distance from a base station of a relevant sector to a nearest base station in a direction of an antenna main lobe of the relevant sector, a distance from the base station of the relevant sector to a nearest base station in a direction of the antenna main lobe of the relevant sector+ a direction of an antenna beamwidth/2 degree, and a distance from the base station of the relevant sector to a nearest base station in the direction of the antenna main lobe of the relevant sector−the direction of the antenna beamwidth/2 degree.

11. The method of claim 10, wherein a largest path loss value of path loss values between the sector j and the determined at least one virtual user position of the sector i is determined as the proximity of the sector i with respect to the sector j, and a largest path loss value of path loss values between the sector i and the determined at least one virtual user position of the sector j is determined as the proximity of the sector j with respect to the sector i.

12. The method of claim 1, wherein a predetermined number (N) of base stations having maximum proximities that exclude a self base station are determined as the minimum unit group for the ID cell allocation with respect to respective sectors inside a base station of the selected sector.

13. The method of claim 12, wherein the predetermined number N is determined such that N meets an equation defined as:

$$\sum_{j=1}^{K}\sum_{i=1}^{N}(\text{Count\_High\_Proximity\_Sectors})_{ji} -$$

$$\text{Count\_Duplicated\_Sectors} + (K - 1) \le \text{Max\_Available\_IDcell}$$

where K is the number of sectors inside a base station of the selected sector, N is a proximity ranking excluding a self base station with respect to the base station of the selected sector, (Count_High_Proximity_Sectors)$_{ji}$ is the number of sectors of a base station of an i-th proximity ranking with respect to a j-th sector of the base station of the selected sector, Count_Duplicated_Sectors is a duplicated base station of maximum proximity, and Max_Available_IDcell is the number of maximum available resources of ID cells.

14. The method of claim 1, wherein the minimum unit group for ID cell allocation comprises the neighbor list of the selected sector.

15. An apparatus for allocating an Identification (ID) cell in a wireless communication system, the apparatus comprising:

a sector selector configured to select one sector inside the system;

a temporary ID cell selector configured to select a temporary ID cell for the selected sector;

a temporary ID cell duplication determination unit configured to determine whether an ID cell of a sector to which the ID cell has been already allocated inside a minimum unit group for ID cell allocation is the same as the temporary ID cell, and determine whether Pseudo Noise (PN) codes of sectors inside a neighbor list of the selected sector are the same as temporary PN codes determined using the temporary ID cell; and an ID cell allocation unit configured to, when the temporary ID cell is not duplicated and the temporary PN codes are not duplicated, allocate the selected temporary ID cell as an ID cell of the selected sector.

16. The apparatus of claim 15, wherein when duplication of the temporary ID cell occurs, the temporary ID cell selector is configured to change the temporary ID cell and selects the same with respect to the selected sector.

17. The apparatus of claim 16, wherein when a frequency of the changing of the temporary ID cell is equal to or greater than a maximum ID cell change frequency, the ID cell allocation unit allocates a candidate ID cell as the ID cell of the selected sector.

18. The apparatus of claim 17, wherein the temporary ID cell is one of ID cells ranging from 0 to 31, and the candidate ID cell is one of the rest of ID cells excluding the ID cells ranging from 0 to 31.

19. The apparatus of claim 15, wherein the temporary ID cell duplication determination unit is configured to determine whether an ID cell of a other sector to which the ID cell has been already allocated inside a base station that is the same as a base station of the selected sector is the same as the temporary ID cell, and when the ID cell of the other sector to which the ID cell has been already allocated inside the base station that is the same as the base station of the selected sector is not the same as the temporary ID cell, the ID cell allocation unit is configured to allocate the selected temporary ID cell as the ID cell of the selected sector.

20. The apparatus of claim 15, wherein the temporary ID cell duplication determination unit is configured to determine, with respect to the sectors inside the neighbor list of the selected sector, whether the selected sector is included in a neighbor list of a relevant sector and whether a PN code of a other sector inside the neighbor list of the relevant sector is the same as the temporary PN code determined using the temporary ID cell, and with respect to the sectors inside the neighbor list of the selected sector, when the selected sector is included in the neighbor list of the relevant sector, and the PN code of the other sector inside the neighbor list of the relevant sector is not the same as the temporary PN code determined using the temporary ID cell, the ID cell allocation unit allocates the selected temporary ID cell as the ID cell of the selected sector.

21. The apparatus of claim 15, further comprising:
a PN code duplication frequency determination unit configured to, when ID cell allocation of all sectors inside the system is completed, determine a sum of PN code duplication frequencies inside neighbor lists of all the sectors; and
a best ID cell allocation determination unit configured to repeat a process of allocating an ID cell to all the sectors inside the system by a predetermined number of times to determine ID cell allocation of a case where the determined sum of the PN code duplication frequencies inside the neighbor lists of all the sectors is smallest, as best ID cell allocation.

22. The apparatus of claim 15, wherein the ID cell allocation unit is configured to select a sector having highest proximity to the selected sector from sectors where duplication of the temporary PN code occurs, and sets proximity thereof as proximity of a sector having a highest duplication degree for the temporary ID cell, and
when duplication of all temporary ID cells of the selected sector occurs, the ID cell allocation unit is configured to compare proximities to a sector having a highest duplication degree, which are set for respective temporary ID cells, and allocate a temporary ID cell having lowest proximity as the ID cell of the selected sector.

23. The apparatus of claim 22, further comprising a proximity determination unit configured to:
select one sector pair (i, j) from sector pairs inside the system;
determine a virtual user position representing the sector i;
determine proximity of the sector i with respect to the sector j using the determined virtual user position of the sector i;
determine a virtual user position representing the sector j;
determine proximity of the sector j with respect to the sector i using the determined virtual user position of the sector j; and
determine a larger value of the proximity of the sector i with respect to the sector j, and the proximity of the sector j with respect to the sector i, as proximity of the sector pair (i, j).

24. The apparatus of claim 23, wherein a virtual user is positioned at least one of a distance from a base station of a relevant sector to a nearest base station in a direction of an antenna main lobe of the relevant sector, a distance from the base station of the relevant sector to a nearest base station in a direction of the antenna main lobe of the relevant sector+ a direction of an antenna beamwidth/2 degree, and a distance from the base station of the relevant sector to a nearest base station in the direction of the antenna main lobe of the relevant sector− the direction of the antenna beamwidth/2 degree.

25. The apparatus of claim 24, wherein a largest path loss value of path loss values between the sector j and the determined at least one virtual user position of the sector i is determined as the proximity of the sector i with respect to the sector j, and
a largest path loss value of path loss values between the sector i and the determined at least one virtual user position of the sector j is determined as the proximity of the sector j with respect to the sector i.

26. The apparatus of claim 15, further comprising a minimum unit group determining unit for determining a predetermined number (N) of base stations having maximum proximities that exclude a self base station as the minimum unit group for the ID cell allocation with respect to respective sectors inside a base station of the selected sector.

27. The apparatus of claim 26, wherein the predetermined number N is determined such that N meets an equation defined as:

$$\sum_{j=1}^{K}\sum_{i=1}^{N}(\text{Count\_High\_Proximity\_Sectors})_{ji} - \text{Count\_Duplicated\_Sectors} + (K-1) \leq \text{Max\_Available\_IDcell}$$

where K is the number of sectors inside a base station of the selected sector, N is a proximity ranking excluding a self base station with respect to the base station of the selected sector, (Count_High_Proximity_Sectors)$_{ji}$ is the number of sectors of a base station of an i-th proximity ranking with respect to a j-th sector of the base station of the selected sector, Count_Duplicated_Sectors is a duplicated base station of maximum proximity, and Max_Available_IDcell is the number of maximum available resources of ID cells.

28. The apparatus of claim 15, wherein the minimum unit group for ID cell allocation comprises the neighbor list of the selected sector.

* * * * *